United States Patent Office 3,487,695
Patented Jan. 6, 1970

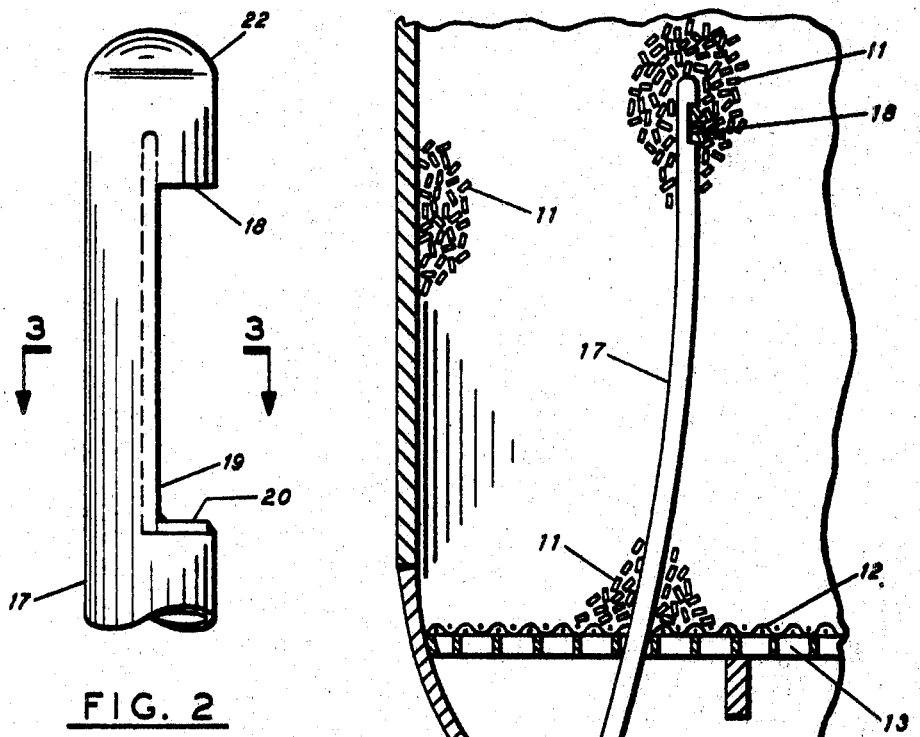
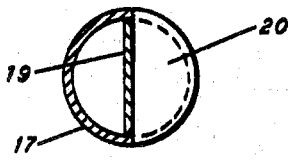
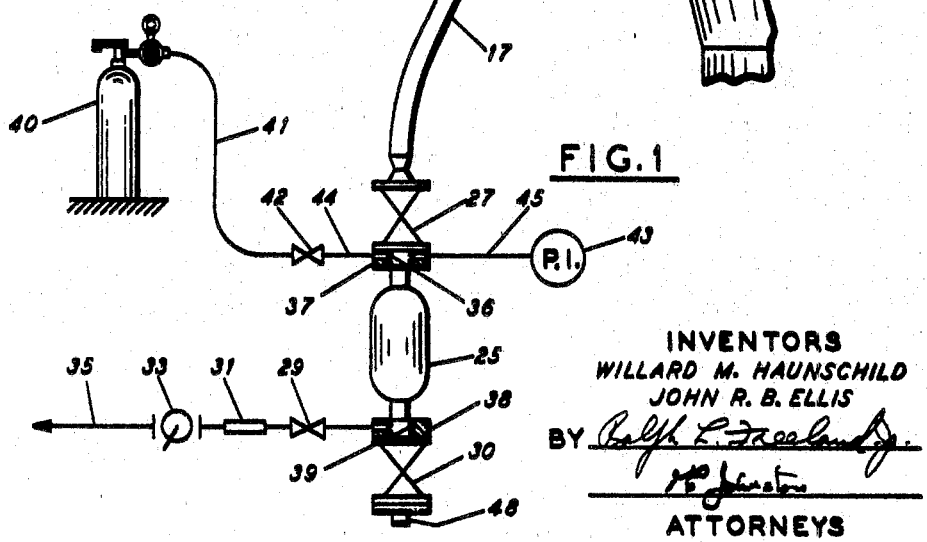

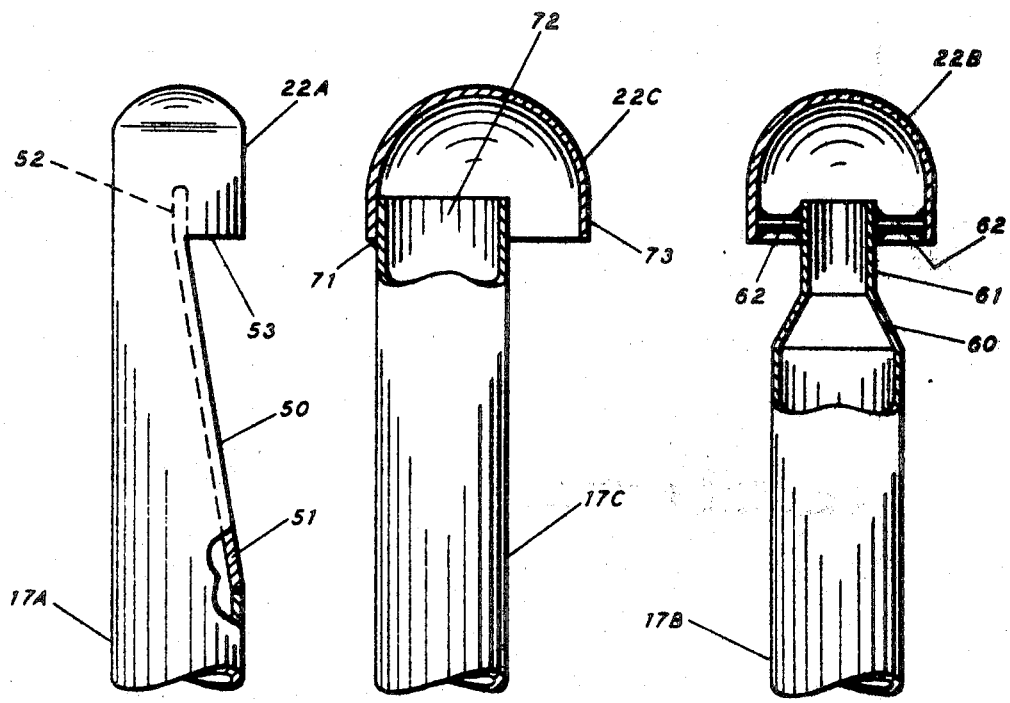

3,487,695
GAS LIFT CATALYST SAMPLER
Willard M. Haunschild, Walnut Creek, and John R. B. Ellis, Kentfield, Calif., assignors to Chevron Research Company, San Francisco, Calif., a corporation of Delaware
Filed June 12, 1968, Ser. No. 736,457
Int. Cl. G01n 1/02
U.S. Cl. 73—421                    10 Claims

ABSTRACT OF THE DISCLOSURE

Apparatus for withdrawing catalyst samples during operation of a catalytic reactor that uses a sample tube extending to a desired sample point in the reactor. The sample inlet is on one side of the closed inner end of the tube. An internal baffle prevents catalyst from flowing directly into the sample tube except when there is a flow of gas through the sample opening which fluidizes the catalyst in the vicinity of the sample opening and lifts it over the baffle. The gas with entrained catalyst particles pass through the sample tube into a sample receiver where the catalyst sample is trapped and the gas released to an exhaust line. A flow restrictor in the gas line controls the rate of gas flow and hence the rate at which the catalyst sample is drawn into the receiver. The sample receiver can be isolated from the catalytic reactor permitting the catalyst sample to be recovered without disturbing the catalytic reactor. The system is particularly useful in fixed bed reactors for sampling non-spherical catalyst particles that have a relatively high angle of repose.

---

This invention relates to method and apparatus for removing particulate solids from a point within a containing vessel, such as a catalytic reactor. More particularly, it relates to a sampler for removing a few catalyst particles having a high angle of repose from a packed bed of catalytic material by changing the pressure in the vessel to fluidize a part of the catalyst bed directly adjacent the upper end of an elongated sample tube and then conveying the so fluidized particles under pressure through the sample tube directly from the vessel into a sample chamber.

It is a particular object of the present invention to provide a method and apparatus for removing catalyst samples from a catalytic reactor vessel where the catalyst particles are relatively resistant to flow. In a preferred form of apparatus for carrying out the method, the upper end of an elongated sample tube, having a substantially uniform diameter, is sealed at its upper end to prevent direct entry of catalyst particles into the tube. An entry port to the tube opens toward said sealed upper end, and with a baffle member extending along the tube toward the sealed end to form a flow restriction relative to the size of said tube, to control catalyst flow into the tube when pressures are locally upset adjacent said entry port. In this way, catalyst particles first flow toward the closed end of the tube along the baffle member and then outwardly from the sealed end of said tube to a sample chamber. A pressure-regulating valve connected at the outlet end of the sample chamber regulates gas flow through the tube to create localized fluidization of the flow resistant particles to permit withdrawal of a representative sample from the reactor vessel. This local upset of pressure conditions in and around the inner end of the sample tube causes a few catalyst particles near the opening into the tube to flow when pressure in the sample chamber is slightly lower than the vessel. A few particles then flow through the restriction formed by the baffle plate and the opening to the tube to pass to the sample chamber. Such sampling permits examination of catalyst in the reactor vessel while hydrocarbons are being converted under actual catalytic reaction conditions. These conditions frequently involve introduction of high pressure gases, such as hydrogen or heated hydrocarbon streams that prevent ready access to the particle bed.

It has been known heretofore that catalysts can be removed from a reaction vessel without upsetting the reactor or unduly disturbing the reaction catalyst. Such earlier known sampling systems depend primarily upon free-flowing charatceristics of the catalyst particles, specifically, most catalysts used heretofore are bead, or ball-type, granules so that their angle of repose (the resistance to flow when stacked in a free-standing pile), is not high. Certain catalysts now in wide use are best produced by extrusion and form cylindrical rods. The rods are then broken to form catalyst particles. These rod-like particles frequently vary in length up to about ¼ to ½ inch. While relatively free to roll about their axes, they do not flow readily when stacked. In fact, their cylindrical form tends to pack the catalyst and increases their rather high angle of repose. The result is that these rod-shaped particles are not easily released from a packed bed and when released tend to "bridge" together across a conduit or port when an attempt is made to free-flow them into a relatively slender sample tube to a sample "trap" or transfer lock chamber formed in the tube. Even if such catalyst can be moved into such a trap chamber, removal to a receiving or sample chamber is easily blocked by bridging due to the high angle of repose of the catalyst in the trap. Accordingly, it is difficult to keep a trap-type catalyst sample operating throughout a catalytic conversion run cycle. These runs are sometimes as long as six months, to a year, in duration; it is desirable, most particularly near the end of one of these extended runs, to be able to look at the catalyst at frequent intervals, say every two or three days. For the foregoing reasons, previous catalyst samplers are likely to be inoperative at these times.

In accordance wtih the present invention, catalyst particles having a high angle of repose and corresponding resistance to free flow from a packed bed are wtihdrawn during operation of the catalytic reactor by first fluidizing a few of the particles in the bed and then quickly pulling them from the bed through an elongated sample tube directly into a sample chamber. A particular advantage of the present method is the ability to sample at almost any point in the reactor vessel, irrespective of location of screen supports or other "internals" of commercial reactors, because straight lengths of sampler tubing are not required to permit operation of rotating or sliding elements required to trap the withdrawn particles. Elimination of rotating or sliding units not only reduces possibility of mechanical failure of these moving parts, but also gives access to parts of the reactor that could not be reached by previously known samplers and permits installation from any point in the reactor walls, top or side, as well as bottom.

Further objects and advantages of the present invention will become apparent from the following detailed description taken in conjunction with the accompanying drawings which form a part of the present specification.

FIGURE 1 is a schematic representation of a catalyst sampler system constructed in accordance with the method of the present invention as applied to a fixed bed catalyst reaction vessel.

FIGURE 2 is a vertical elevation view of the inner end of the sample tube shown in the arrangement of FIGURE 1.

FIGURE 3 is a cross-sectional view of the inner end of the sampler tube shown in FIGURE 2, taken in the direction of arrows 3—3.

FIGURE 4 is a vertical elevation view partially in cross-section of an alternate construction of the baffle and flow opening to the inner end of the sampler tube, similar to the arrangement shown in FIGURE 1.

FIGURE 5 is a vertical elevation view, partially in cross-section, showing another embodiment of the inner end of the sampler tube shown in FIGURES 2 and 4.

FIGURE 6 is a vertical elevation, partially in cross-section illustrating a further embodiment of the inner end of the sample tube shown in FIGURES 2, 4 and 5.

Referring now to the drawings, FIGURE 1 illustrates one embodiment of the invention applied to a fixed bed catalytic reactor vessel 10 containing a catalyst 11 having a high angle of repose. It will be understood that the catalyst is piled or supported in one or more fixed beds; structural support 13 and screen 12 form one such bed in vessel 10. Ordinarily, bubble plate trays to control flow of hydrocarbon through risers and downcomers during the reaction process will be present at several levels in the vessel. Such internals frequently require sample tube 17 to be bent more severely than the gentle curves illustrated therein by FIGURE 1. In typical service, vessel 10 would be supplied with hydrocarbons at one end of the vessel (not shown) and hydrogen or other reacting gases would be admitted at another point (likewise not shown). In any event, catalyst particles 11 are not free to move within the bed and desirably are as little disturbed as possible by reaction conditions of the hydrocarbons undergoing conversion in the catalytic process.

As distinguished from previously known samplers which require closely fitting internal elements that rotate or reciprocate within tube 17, the sample point is not restricted by the availability of openings through various internal elements such as screen 12 and support 13. However, in accordance with the present invention tube 17 need not be straight, and in fact may have convolutions in it without detracting from its ability to draw a sample from the catalyst bed with little or no disturbance of the catalyst bed itself. As shown, tube 17 enters the bottom of reactor 10 through a nozzle opening 16 and is sealed thereto by end plate 14, as by weld or bolts (not shown).

In this preferred embodiment of the present invention, particles 11 directly surround side opening 18 in pipe 17 (best seen in FIGURE 2). Baffle plate 19 covers a part of opening 18, and is sealed at its lower end to pipe 17 by cross-plate 20. This arrangement requires catalyst to enter tube 17 by first flowing toward cap 22 along baffle plate 19. It will be particularly noted that baffle 19 and opening 18 form a flow restriction relative to the diameter of tube 17 so that once particles pass this restriction they are free to flow unobstructedly under gravity, or by a pressure differential, through tube 17 to sample receiver 25.

As shown, entrance to and exit from catalyst sample receiver 25 is under the control of three valves the first of which is designated as block valve 27 between the external, lower end of sampler tube 17 and sample receiver 25. Valve 29 controls changes in pressure that are applied between sample receiver 25 and entry port 18 at the upper end of tube 17 to remove a desired sample from vessel 10. Valve 29 is interconnected to a more readily controllable pressure modulating means, which in the present case includes a flow restriction 31 and snap-operating valve 33. The downstream side of valve 33 is connected to a relief line 35.

As will be more fully discussed in the operation of this gas-lift catalyst sampler, a source of nitrogen, indicated as tank 40, may be connected through line 41 and valve 42 to an inlet tube 44 at the upper end of sample receiver 25. Pressure indicator (PI) gauge 43 is also connected to sample receiver 25 at this point by line 45. It will be seen that the connection of lines 44 and 45 and the line to valve 29 are through the upper flange 37 and lower flange 38, respectively.

As indicated, screen 36 in flange 37 and screen 39 in flange 38 permit gas flow but prevent catalyst particles from flowing into the gas systems.

FIGURES 4, 5 and 6 illustrate alternate forms of catalyst intake ports at the inner end of sample tube 17. In FIGURE 4, tube 17A terminates in a V-slot 50 covered by baffle plate 51 that extends upwardly toward closed or capped end 22A. As in the arrangement of FIGURE 2, baffle plate 51 includes portion 52 that extends above inlet opening 53. By this arrangement of baffle and inlet a flow restriction is created relative to the diameter of sample tube 17A that assures a high velocity across opening 53. It also assures free flow through tube 17A after the particles enter and avoids bridging thereof in the tube.

In the arrangement of FIGURE 5, sample tube 17B includes tapered portion 60 and reduced diameter portion 61 that also form a baffle extending upwardly into cap 22B. As shown, the opening into tube 17B is between the inner diameter of cap 22B and reduced diameter tube 61. Cap 22B is mounted on tube 61 by rods 62 to form the constricted opening to tube 17B. FIGURE 6 illustrates a further embodiment of baffle and restricted opening to prevent direct flow into sample tube 17C. In this arrangement, cap 22C is larger in diameter than tube 17C and is welded at one side, as at 71, to cover the inner end 72 of tube 17C. End 72 together with skirt portion 73 of cap 22C forms the desired baffle and re-entry flow for catalyst particles in accordance with the present invention.

In operation of the preferred embodiment, advantage is taken of a rapid change in pressure that can be effected between vessel 10 around sampler opening 18 and receiver 25 by snap operating valve 33. This upset in the stability of the catalyst bed directly surrounding opening 18 is made by a quick drop in pressure when valve 33 exhausts through line 35. Such a momentary upset causes a few of the catalyst particles immediately surrounding opening 18 to become fluidized so that they flow over the weir formed by baffle plate 19 toward closed end 22 of tube 17 and then flow by entrainment in the gas through the lower end of tube 17, open valve 27 into sample receiver 25. Closed valve 30 holds the sample in receiver 25 and screen 39 prevents particles from entering the pressure control system, valves 29 and 33, restriction 31 and exhaust line 35.

In a preferred manner of operation, sample receiver 25 is left isolated when not in use by closing valves 27, 29, 30 and 42. At the beginning of the sampling operations, the pressure in receiver 25 is read on gauge 43 and any gas accumulated in receiver 25 vented to exhaust line 35 by opening valves 29 and 33. After venting valves 29 and 33 are closed and gauge 43 is observed to make sure valve 27 is not leaking at a rate which would prevent safe operation during the subsequent catalyst withdrawal steps. Receiver 25 is then brought to the same pressure as that in reactor 10 by introducing nitrogen from tank 40 through lines 41 and 44 and valve 42. Valve 27 is then opened to connect sample tube 17 directly to receiver 25. The sample may then be drawn into the receiver 25 by first opening valve 29 and then snapping open valve 33 for a short period, say, one second. A sudden drop in pressure, created by opening receiver 25 to a low pressure, such as atmospheric creates a high velocity gas flow across opening 18 to the inner end of sample tube 17. Such a rapid upset of pressure conditions around the inner end of tube 17 causes a local fluidization of the relatively stable catalyst particles in the immediate vicinity of opening 18 and creates sufficient pressure differential to cause some of the catalyst particles to enter opening 18 by first flowing towards closed cap 22 and over the end of baffle 19 to enter chamber 17. The period of time that snap valve 33 is held open is, of course, dependent upon the size of the sample desired and the size of receiver 25. Upon completion of the sampling period, valve 27 is closed and valve 33 is opened to vent line 35. Nitrogen is then introduced from tank 40 through lines 41 and 44 by opening valve 42 to purge the sample in receiver 25. After purging is complete, valve 42 is closed and residual nitrogen vented through valve 33, following which valve 30 is opened to obtain the sample of catalyst particles 11.

If more than one sample is to be taken, the foregoing procedure in general is repeated with care being taken that sample chamber 25 is isolated and properly pressured before a sample is drawn into or discharged from it. In each case the chamber will be purged with nitrogen before and after the sample is drawn to assure that a potentially explosive gas mixture is not retained therein after the catalyst sample is removed.

Various modifications and changes in the arrangement shown can be made without departing from the scope of the invention. For example, tube 17 instead of being arranged for gravity fall of catalyst from opening 18 through receiver 25 may, if desired, be inserted from the top of vessel 10 so that flow is upward from opening 18 to receiver 25 under the control of snap valve 33. As another example, if vessel 10 is operating under vacuum conditions as compared to atmosphere, it may be desirable to connect a vacuum unit to bleeder line 35 to assure that the pressure differential between sampler 25 and opening 18 is sufficient to entrain the necessary sample.

Other modifications and changes will become apparent to those skilled in the art from the foregoing description.

We claim:

1. Apparatus for withdrawing a characteristic sample of particulate solid catalyst having a high angle of repose from a fixed bed catalytic reactor comprising an elongated sample tube extending inwardly through an exterior wall of said catalytic reactor to a desired level therein, the exterior end of said sample tube terminating at a seal valve, said sample tube being of substantially uniform diameter throughout its length, and the inner end of said tube being closed terminating in a closed cap, means forming an opening at one side of said tube adjacent said closed end cap, a baffle extending along said opening to prevent direct flow into said tube and extending into said closed end cap portion of said tube, said baffle and said opening forming a flow restriction relative to the diameter of said sample tube, a sample receiver connected through said seal valve means to the outer end of said sample tube, a conduit connected to the outlet end of said sample receiver for flowing gas under pressure from said reactor through said sample tube and said sample receiver, control valve means in said conduit for regulating the rate of flow of gas from said reactor to said sample receiver to create a localized flow of catalyst particles in said reactor around said opening to said sample tube to flow a desired quantity of catalyst particles into said sample receiver, and additional valve means for selectively opening and closing said sample receiver to withdraw a characteristic sample of the catalyst in said reactor without upset of reaction conditions in said reactor.

2. Apparatus in accordance with claim 1 wherein said closed end of said sample tube is a cap and said opening is on one side of said tube with said baffle in a plate extending substantially diametrically across said tube with one end thereof entering said cap.

3. Apparatus in accordance with claim 2 wherein in said side opening is a V-notch in said sample tube.

4. Apparatus in accordance with claim 1 wherein said closed end is a cap member having a diameter larger than the upper end of said sample tube.

5. Apparatus in accordance with claim 4 where said sample tube includes a reduced diameter portion that extends into said cap member to form said baffle.

6. Apparatus in accordance with claim 4 where said cap member includes a skirt portion extending to one side of said sample tube to form said side opening into said sample tube.

7. Apparauts for withdrawing a characteristic sample of particulate solid catalyst having a high angle of repose from a fixed bed catalytic reactor comprising an elongated sample tube extending inwardly through an exterior wall of said catalytic reactor to a desired level therein, the exterior end of said sample tube terminating at a seal valve, said sample tube being of substantially uniform diameter throughout its length, and the inner end of said tube terminating in a closed cap, means forming an opening at one side of said tube adjacent said closed cap, a baffle extending along said opening to prevent direct flow into said tube and extending into said closed cap portion of said tube, said baffle and said opening forming a flow restriction relative to the diameter of said sample tube, a sample receiver connected through said seal valve means to the outer end of said sample tube, a conduit connected to the outlet end of said sample receiver for flowing gas under pressure from said reactor through said sample tube and said sample receiver, control valve means in aid conduit for regulating the rate of flow of gas from said reactor to said sample receiver to create a localized flow of catalyst particles in said reactor around said opening to said sample tube to flow a desired quantity of catalyst particles into said sample receiver, and additional valve means for selectively opening and closing said sample receiver to withdraw a characteristic sample of the catalyst in said reactor without upset of reaction conditions in said reactor.

8. The method of withdrawing a catalyst sample from a fixed bed catalytic reactor at a sampling point within said fixed bed catalytic reactor by locally fluidizing a small volume of said bed about said point which comprises the steps of
   (a) forming an elongated flow path through said catalyst bed from a sample receiver outside the reaction vessel to said sampling point,
   (b) establishing pressure equilibrium in said flow path between said sample receiver and said point in said vessel,
   (c) rapidly changing the pressure in said sample receiver and said flow path with respect to the pressure in said vessel to upset the flow stability of catalyst particles over a limited volume of said bed about said sampling point, said pressure change being in a direction and to an extent sufficient to draw a selected number of said catalyst particles into said flow path and said sample receiver, then
   (d) isolating at least the catalyst particle sample receiver from said reaction vessel to permit withdrawal of said catalyst particles entrapped therein during said pressure change without further disturbances of reaction conditions in said vessels and then
   (e) withdrawing said catalyst particles from said sample receiver for examination of their condition in said reaction vessel.

9. The method of claim 8 wherein said flow path extends into said reactor for a point not lower than said sampling point and said flow path includes a flow restriction at the entry point thereto.

10. The method of claim 8 wherein the rapid change in pressure is created by applying vacuum to the flow path from a point exterior to the reactor.

References Cited

UNITED STATES PATENTS

| | | | |
|---|---|---|---|
| 2,771,776 | 11/1956 | Haven | 73—421 |
| 3,319,469 | 5/1967 | Hartung | 73—421 |

S. CLEMENT SWISHER, Primary Examiner